United States Patent
Parker

(10) Patent No.: US 9,790,787 B2
(45) Date of Patent: Oct. 17, 2017

(54) LWD RESISTIVITY IMAGING TOOL WITH ADJUSTABLE SENSOR PADS

(71) Applicant: Halliburton Energy Services, Inc., Houston, TX (US)

(72) Inventor: Timothy James Parker, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 134 days.

(21) Appl. No.: 14/403,966

(22) PCT Filed: Aug. 30, 2013

(86) PCT No.: PCT/US2013/057638
§ 371 (c)(1),
(2) Date: Nov. 25, 2014

(87) PCT Pub. No.: WO2015/030808
PCT Pub. Date: Mar. 5, 2015

(65) Prior Publication Data
US 2016/0032717 A1  Feb. 4, 2016

(51) Int. Cl.
*G01V 1/00* (2006.01)
*E21B 49/00* (2006.01)
(Continued)

(52) U.S. Cl.
CPC ............. *E21B 49/00* (2013.01); *E21B 47/01* (2013.01); *E21B 47/12* (2013.01); *E21B 47/18* (2013.01);
(Continued)

(58) Field of Classification Search
CPC .......... E21B 47/01; E21B 47/12; E21B 47/18; E21B 49/00; G01V 3/20; G01V 1/40; G01V 1/181; G01V 11/005; G01V 5/12
See application file for complete search history.

(56) References Cited

U.S. PATENT DOCUMENTS 3,429,384 A   2/1969   Shore
4,056,004 A   11/1977  Roesner
(Continued)

FOREIGN PATENT DOCUMENTS

GB   2334982 A   9/1999

OTHER PUBLICATIONS

International Search Report and Written Opinion of PCT Application No. PCT/US2013/057638 dated May 20, 2014: pp. 1-16.
(Continued)

*Primary Examiner* — Krystine Breier
(74) *Attorney, Agent, or Firm* — Chamberlain Hrdlicka

(57) ABSTRACT

A logging while drilling tool for measuring a geological formation surrounding a wellbore includes a tool body having one or more sensor pads. Each sensor pad is coupled to the tool body by an extendable coupling that is operable to adjust the radial position of the sensor pad by extending away from or retracting toward the tool body. One or more sensors are mounted to each sensor pads and the sensors are operable to obtain a measurement a property of the formation. The tool also includes a downhole control unit having a transmitter and receiver. The downhole control unit is operable to receive the measurement and transmit the measurement to a surface controller, wherein the transmitted measurement indicates a measurement resolution.

18 Claims, 4 Drawing Sheets

(51) Int. Cl.

| | |
|---|---|
| *E21B 47/01* | (2012.01) |
| *G01V 3/20* | (2006.01) |
| *E21B 47/12* | (2012.01) |
| *E21B 47/18* | (2012.01) |
| *G01V 1/18* | (2006.01) |
| *G01V 1/40* | (2006.01) |
| *G01V 5/12* | (2006.01) |
| *G01V 11/00* | (2006.01) |

(52) U.S. Cl.
CPC ............... *G01V 1/181* (2013.01); *G01V 1/40* (2013.01); *G01V 3/20* (2013.01); *G01V 5/12* (2013.01); *G01V 11/005* (2013.01)

(56) References Cited

U.S. PATENT DOCUMENTS

| | | |
|---|---|---|
| 4,621,396 A | 11/1986 | Walker et al. |
| 5,242,020 A | 9/1993 | Cobern |
| 5,318,138 A | 6/1994 | Dewey et al. |
| 6,041,860 A | 3/2000 | Nazzal et al. |
| 6,226,595 B1 | 5/2001 | Rossi et al. |
| 6,230,557 B1 | 5/2001 | Ciglenec et al. |
| 6,272,232 B1 | 8/2001 | Delhomme et al. |
| 6,464,019 B1 | 10/2002 | Werner et al. |
| 6,523,474 B2 | 2/2003 | Parrott et al. |
| 6,564,883 B2 | 5/2003 | Fredericks et al. |
| 6,702,039 B2 | 3/2004 | Parrott et al. |
| 6,865,978 B2 | 3/2005 | Kash |
| 6,941,871 B2 | 9/2005 | Mauldin |
| 7,083,006 B2 | 8/2006 | Kruspe et al. |
| 7,117,733 B2 | 10/2006 | Engels et al. |
| 7,185,715 B2 | 3/2007 | Krueger et al. |
| 7,246,548 B2 | 7/2007 | Kash |
| 7,409,774 B2 | 8/2008 | Luling |
| 7,413,032 B2 | 8/2008 | Krueger |
| 7,696,757 B2 | 4/2010 | Itskovich et al. |
| 7,798,216 B2 | 9/2010 | Phillips et al. |
| 7,882,905 B2 | 2/2011 | Radford et al. |
| 7,971,662 B2 | 7/2011 | Beuershausen |
| 8,073,623 B2 | 12/2011 | Hartmann et al. |
| 8,115,490 B2 | 2/2012 | Gorek et al. |
| 8,225,868 B2 | 7/2012 | Morley et al. |
| 8,390,294 B2 | 3/2013 | Gold et al. |
| 2005/0067190 A1 | 3/2005 | Tabanou et al. |
| 2006/0220649 A1 | 10/2006 | Martinez et al. |
| 2006/0238202 A1 | 10/2006 | Gorek et al. |
| 2006/0254819 A1 | 11/2006 | Moriarty |
| 2009/0167556 A1 | 7/2009 | Signer et al. |
| 2010/0224360 A1* | 9/2010 | MacDougall ........... E21B 17/07 166/250.01 |
| 2010/0276144 A1 | 11/2010 | Hetz et al. |
| 2010/0300750 A1 | 12/2010 | Hales et al. |
| 2011/0226531 A1 | 9/2011 | Jones |
| 2012/0048542 A1* | 3/2012 | Jacob .................. E21B 17/1021 166/254.2 |
| 2012/0131996 A1* | 5/2012 | Anish ................. E21B 17/1021 73/152.54 |
| 2012/0192640 A1 | 8/2012 | Minh et al. |
| 2012/0273222 A1 | 11/2012 | Smith et al. |
| 2012/0321209 A1 | 12/2012 | Le et al. |
| 2013/0293235 A1* | 11/2013 | Bloemenkamp et al. ........................ G01V 3/24 324/356 |

OTHER PUBLICATIONS

European Search Report issued in corresponding application No. 13884379.2 dated Sep. 16, 2016, 8pgs.

* cited by examiner

LWD RESISTIVITY IMAGING TOOL WITH ADJUSTABLE SENSOR PADS

FIELD OF THE INVENTION

The present disclosure relates generally to the recovery of subterranean deposits, and more specifically to a downhole imaging tool having adjustable imaging sensors for use in logging-while-drilling applications.

DESCRIPTION OF RELATED ART

Wells are drilled at various depths to access and produce oil, gas, minerals, and other naturally-occurring deposits from subterranean geological formations. The drilling of a well is typically accomplished with a drill bit that is rotated within the well to advance the well by removing topsoil, sand, clay, limestone, calcites, dolomites, or other materials. The drill bit is typically attached to a drill string that may be rotated to drive the drill bit and within which drilling fluid, referred to as "drilling mud" or "mud", may be delivered downhole. The drilling mud is used to cool and lubricate the drill bit and downhole equipment and is also used to transport any rock fragments or other cuttings to the surface of the well.

As wells are established, it is often useful to obtain information about the well and the geological formations through which the well passes. Information gathering may be performed using tools that are coupled to or integrated into the drill string. The process of "measurement while drilling (MWD)" uses measurement tools to determine formation and wellbore temperatures and pressures, as well as the trajectory of the drill bit.

In some instances, the process of "logging while drilling (LWD)" includes using imaging tools to form an image of the wellbore and the geological formation surrounding the wellbore to determine additional formation properties such as permeability, porosity, resistivity, and other properties. The information obtained by MWD and LWD allows operators to make real-time decisions and changes to ongoing drilling operations.

DETAILED DESCRIPTION OF ILLUSTRATIVE EMBODIMENTS

Figure 1:
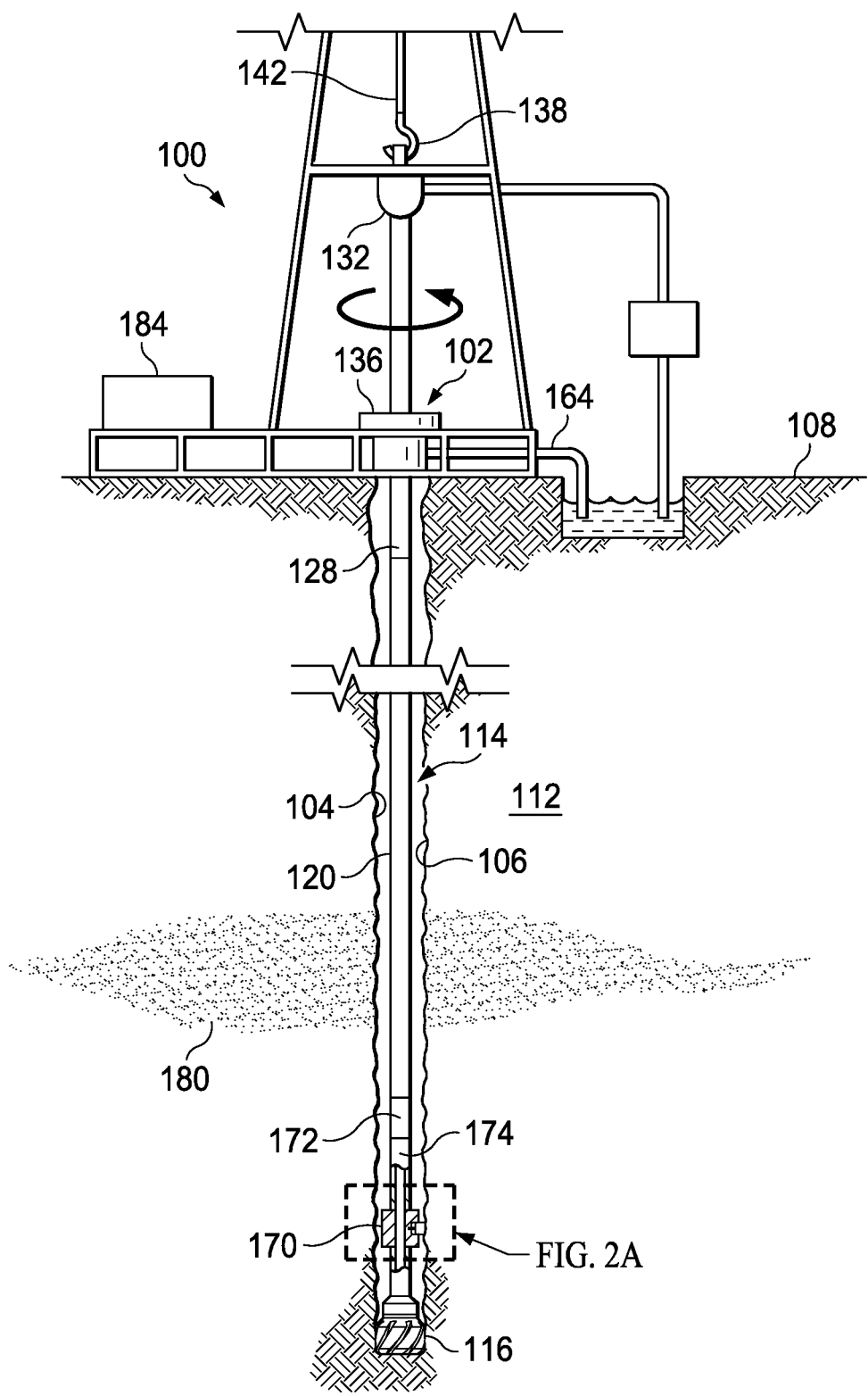
FIG. 1 illustrates a schematic, front view of a well in which an imaging tool according to an illustrative embodiment is deployed in an LWD assembly.

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The systems and methods described herein provide an imaging tool, which may be in the form of an enhanced drilling tool collar. The imaging tool may be used to measure formation properties, such as permeability, porosity, resistivity, and other properties, during drilling operations to allow operators to make real-time decisions and changes to ongoing drilling operations. A tool collar and systems including such an imaging tool are described that allow for the generation of an image of such formation properties during drilling, while also providing the ability to monitor formation properties in a range of wellbore diameters using a single tool collar. The imaging tool may include a plurality of pads that are mounted circumferentially around a tool collar body, and each pad may carry one or more sensors, such as electrodes, geophones, and spectrometers. The tool collar body may also include one or more transmitter coils that cause current to flow throughout the tool collar body, sensor pads, electrodes, and the surrounding rock formation. In addition, the tool collar body may include receiver coils to measure the current in the formation to determine the resistivity of the rock adjacent to each transmitter coil. In another embodiment, geophones or spectrometers may be used as sensors to determine an image of the wellbore based on seismic or gamma ray imaging data. The imaging tool may be rotated with the drill string as drilling takes place and may include sensors that determine the orientation of the tool collar within the wellbore to capture a complete image of the wellbore and surrounding formation based on, for example, measurements of the formation resistivity, seismic data, or gamma ray image data.

More generally, the illustrative embodiments described in the following disclosure relate to the gathering and processing of imaging data from a formation through which a well passes. The formation measurement tools, systems and methods described herein may be used with any of the various techniques employed for evaluating formations including, without limitation, measurement while drilling (MWD), and logging while drilling (LWD). The various tool collars described herein may be delivered downhole as part of a drill string or even as a part of a wireline-delivered downhole assembly.

Referring to FIG. 1, an LWD system 100 according to an illustrative embodiment is used in a well 102 having a wellbore 104 that extends from a surface 108 of the well 102 to or through a subterranean formation 112. The well 102 is illustrated onshore in FIG. 1 with the LWD system 100 being deployed in an LWD assembly 114. In another embodiment, the LWD system 100 may be deployed in a sub-sea well accessed by a fixed or floating platform.

The well 102 is formed by a drilling process in which a drill bit 116 is turned by a drill string 120 that extends from the drill bit 116 to the surface 108 of the well 102. The drill string 120 may be made up of one or more connected tubes or pipes, of varying or similar cross-section. The drill string may refer to the collection of pipes or tubes as a single component, or alternatively to the individual pipes or tubes that comprise the string. The term drill string is not meant to be limiting in nature and may refer to any component or components that are capable of transferring rotational energy from the surface of the well to the drill bit. In several embodiments, the drill string 120 may include a central passage disposed longitudinally in the drill string and capable of allowing fluid communication between the surface of the well and downhole locations.

At or near the surface 108 of the well, the drill string 120 may include or be coupled to a kelly 128. The kelly 128 may have a square, hexagonal or octagonal cross-section. The kelly 128 is connected at one end to the remainder of the drill string and at an opposite end to a rotary swivel 132. The kelly 128 passes through a rotary table 136 that is capable of rotating the kelly 128 and thus the remainder of the drill string 120 and drill bit 116. The rotary swivel 132 allows the kelly 128 to rotate without rotational motion being imparted to the rotary swivel 132. A hook 138, cable 142, traveling block (not shown), and hoist (not shown) are provided to lift or lower the drill bit 116, drill string 120, kelly 128 and rotary swivel 132. The kelly 128 and swivel 132 may be raised or lowered as needed to add additional sections of tubing to the drill string 120 as the drill bit 116 advances, or to remove sections of tubing from the drill string 120 if removal of the drill string 120 and drill bit 116 from the well 102 are desired.

It is noted that an imaging tool, as described in more detail below, may be inserted as a segment of the drill string 120, and may be positioned adjacent to the drill bit 116 to obtain near-bit imaging data. To log formation properties, an imaging tool 170 may be positioned downhole to gather high resolution imaging data that is indicative of the formation. This imaging data allows operators to make intelligent decisions about ongoing operation of the well 102. While the imaging tool 170 is illustrated as a part of the drill string 120 in FIG. 1, in other embodiments, the imaging tool 170 may be lowered into the well 102 by another conveyance, e.g. wireline, slickline, coiled tubing, or the like.

In some embodiments, the imaging tool 170 may include a plurality of tool components that are coupled to one another by threads, couplings, welds, or other means. In the illustrative embodiment depicted in FIG. 1, the imaging tool 170 includes a transceiver unit 172 and a power unit 174, and multiple imaging sensors, as shown in more detail in FIGS. 2A, 2B, 3 and 4. Each of the individual components may also include control electronics such as processor devices, memory devices, data storage devices, and communications devices, or alternatively a centralized control unit may be provided that communicates with and controls one or more of the individual components.

The transceiver unit 172 is capable of communicating with a surface controller 184 or similar equipment at or near the surface 108 of the well 102. Communication between the transceiver unit 172 and the surface controller 184 may be by wire if the drill string 120 is wired or if a wireline evaluation system is deployed. Alternatively, the transceiver unit 172 and surface controller 184 may communicate wirelessly using mud pulse telemetry, electromagnetic telemetry, or any other suitable communication method. Data transmitted by the transceiver unit 172 may include without limitation sensor data, imaging data, or other information gathered by the imaging tool 170. The surface controller 184 may include processing devices, memory devices, data storage devices, communication devices, and user input/output devices. The surface controller 184 may communicate data to the transceiver unit 172 such as control data to direct the operation of the imaging tool 170.

The power unit 174 may be hydraulically powered by fluid circulated through the well or by fluid circulated or pressurized in a downhole, closed-loop hydraulic circuit. Alternatively, the power unit 174 may be an electrical power unit, an electro-mechanical power unit, a pneumatic power unit, or any other type of power unit that is capable of harnessing energy for transfer to powered devices. The power unit 174 may provide power to one or more of the components associated with the imaging tool 170, or alternatively to one or more other downhole devices.

Figure 2A:
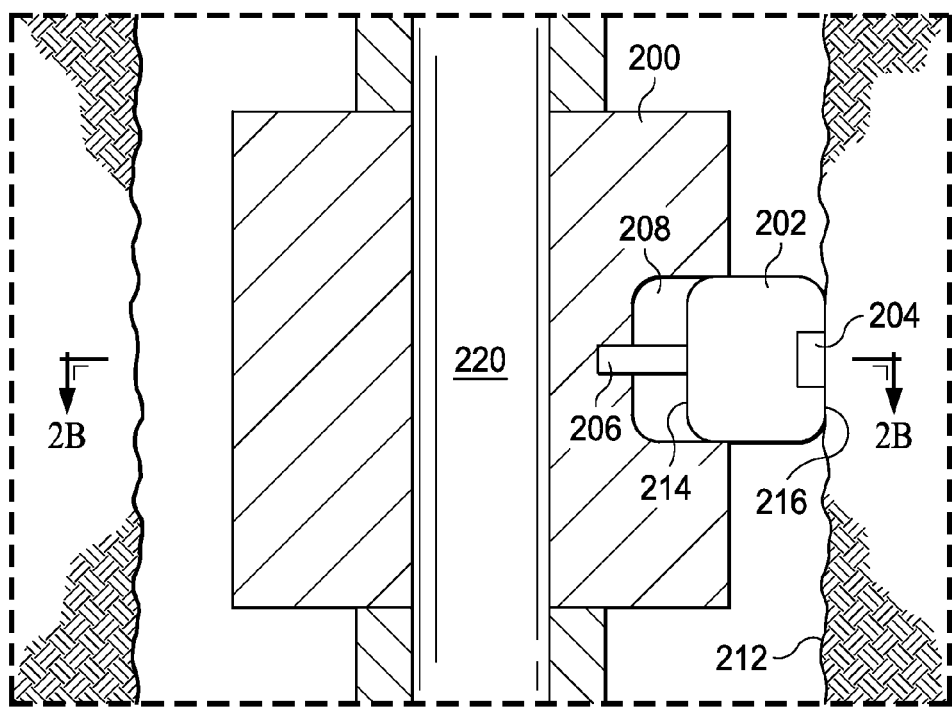
FIG. 2A is a cross-sectional, front view of the imaging tool of FIG. 1.
Figure 2B:
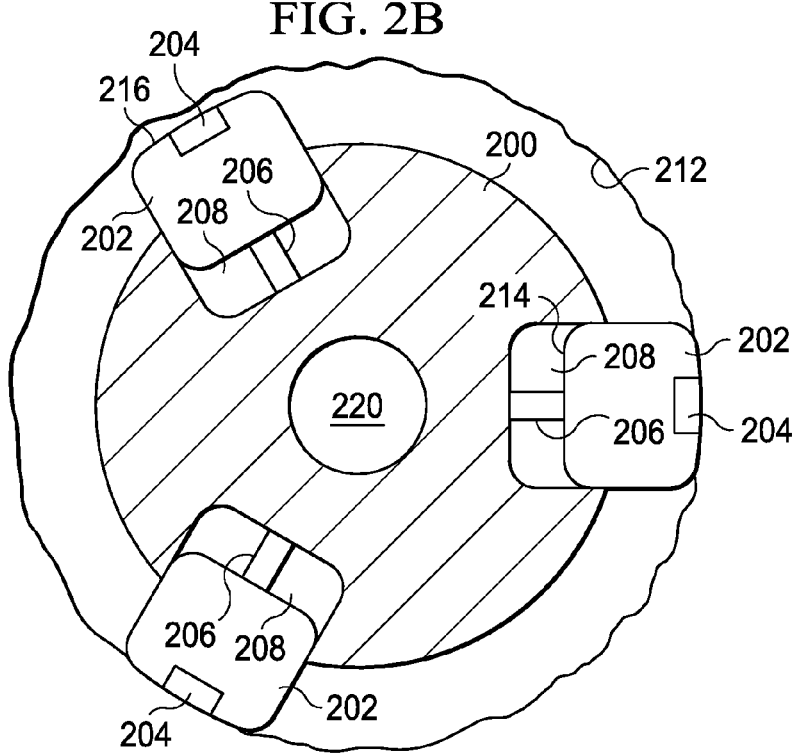
FIG. 2B is a cross-sectional, top view of the imaging of FIG. 2A taken along arrows 2B-2B.

Referring now to FIGS. 2A and 2B, a detail view of an imaging tool, such as imaging tool 170 of FIG. 1, is shown in front and top cross-sectional views. The imaging tool includes a tool body 200, which may be in the form of a tool collar, and one or more sensor pads 202, which may function as stabilizers. The tool body 200 may be made from a metal, a metal alloy or other suitable material that is compatible with the drill string and wellbore environment. The tool body 200 may be machined, cast, or assembled from similarly formed component parts, and may include recesses for imaging tool components, including, for example, electronics housings, couplings, sensors, and other components.

Each sensor pad 202 is coupled to the tool body 200 by an extendable coupling 206 that is operable to extend from a fully retracted position to a fully extended position (as shown in FIGS. 2A and 2B). The extendable coupling 206 may be a biasing spring that biases the sensor pad 202 away from the tool body 200 toward the wall 212 of the wellbore, a controllable hydraulic piston that extends and retracts the extendable coupling 206 in response to a control signal received from a downhole control unit (as described in more detail below), a motorized extension arm that includes, for example, a servo motor that is controllable by the downhole control unit, or any other suitable device that is operable to extend and retract the sensor pad 202 away from and toward the tool body 200.

In an embodiment, the tool body 200 includes a recess 208, which may be formed by a machining process such as milling or by casting all or a portion of the tool body 208 to include the recess 208. When in the fully retracted position, the sensor pad 202 and the extendable coupling 206 may be completely contracted such that the entirety of the sensor pad 202 resides within the recess 208 of the tool body 200 such that an outer surface of the sensor pad 202 is flush with a periphery of the tool body 200. When in the fully extended position, the extendable coupling 206 may be extended toward the end of its travel, such that the sensor pad 202 is positioned as far away from the tool body 200 as possible based on the size and configuration of the extendable coupling 206. For example, the extendable coupling 206 may have a maximum travel of a preset distance, such as 50 mm, or a distance that is equivalent to the expected distance between the periphery of the tool body 200 and the wall 212 of the wellbore. For example, if the expected distance from the periphery of the tool body 200 to the wall 212 of the wellbore is 100 mm, then the extendable coupling 206 may be sized and configured to extend the sensor pad 202 a distance of 100 mm to come into contact with the wall of the wellbore. In an embodiment, the tool body 200 may have a diameter of 4.75 inches and the wellbore may have a diameter of 6.75 inches, thereby providing the sensor pad 202 will be extendable by approximately 2 inches. In another embodiment, the tool body 200 may have a diameter of 6.75 inches and the wellbore may have a diameter of 9.625 inches, providing for extension of the sensor pad 202 by approximately 2.875 inches. In another embodiment, the tool body 200 may have a diameter of 8 inches and the wellbore may have a diameter of 12.25 inches, providing for extension of the sensor pad 202 by approximately 4.25 inches. Other suitable configurations are also possible and are contemplated by the embodiments described herein.

In an embodiment, each sensor pad 202 is coupled to the tool body 200 by the extendable coupling 206 at a base 214 of the sensor pad 202. Each sensor pad 202 may have a preselected thickness between the base 214 and an outer surface, which may be referred to as a contact surface 216, of the sensor pad 202. In an embodiment, a sensor 204 is embedded within the contact surface 216 of the sensor pad 202. As such, when the sensor pad 202 is in the fully extended position, the sensor 204 may contact the wall 212 of the wellbore. In such an embodiment, the sensor pad 202 may be formed from a wear-resistant or sacrificial protective composition, such as a ceramic or polymer that is selected to move along, while remaining in contact with, the wall 212 of the wellbore. Here, a wear-resistant composition may engage the surface of the wellbore without experiencing significant wear while a sacrificial composition may be configured to wear away at a predetermined rate as a result of movement along the surface of the wellbore. Further, the sensor pad 202 and sensor 204 may be formed to have a curved surface that is configured to correspond to the curved surface of the wall 212 of the wellbore. In such an embodiment, the sensor 204 may be offset from the contact surface 216 of the sensor pad 206 such that the sensor 204 will remain protected from damage resulting from excessive wear or contact with the wall 212 of the wellbore while still remaining a very close distance from the wall 212 of the wellbore. In a similar embodiment, the sensor pads 202 may be equipped with a friction reducing feature, such as a low-friction coating, or a roller, wheel, or movable tread on the leading edge of the sensor pad to protect the sensor pad 202 from wear.

In an embodiment, the tool body 200 includes a downhole control unit having a transmitter and receiver, or transceiver, which may be the control unit 172 referenced with regard to FIG. 1. The downhole control unit is electrically and communicatively coupled to the sensors 204 and extendable couplings 206. As such, the downhole control unit is operable to receive sensor data from the sensors 204 and to transmit the sensor data to a surface controller 184 (see FIG. 1). The sensor data may include a measurement of a property of the geological formation surrounding the wellbore, and may be resistivity or conductivity imaging data, seismic imaging data, gamma ray imaging data, or any other type of measurement data. In an embodiment, the measurement data is transmitted to and processed by the surface controller to form an image of the surface of the wall 212 of the wellbore or the geological formation surrounding wellbore. The measurement data may be transmitted as a mud pulse telemetry signal or wired signal that includes, for example, a resistivity measurement, measurement data from a geophone, or other imaging sensor data. The measurement data may also include data that is indicative of the resolution of an image formed by the measurement data. As referenced herein, resolution may refer to any type of image resolution, including line resolution, pixel resolution, spatial resolution, and radiometric resolution.

In an embodiment, the image sensor data is analyzed either at surface or downhole using mathematical image analysis techniques to determine the resolution or apparent sharpness of the resulting image. Such techniques are similar to those used today in some auto-focus cameras. In another embodiment, an auxiliary measurement from an auxiliary sensor such as, for example, an acoustic transceiver or another similar type of sensor may be used to measure the diameter of the borehole at any given point, and the measured diameter of the borehole may be used to determine the extent to which extendable pads should be extended to place the sensors at an optimal distance from the wall of the wellbore, which may be as close to the wall of the wellbore as possible or less than 0.2 inches.

Referring still to FIGS. 2A and 2B, the imaging tool is deployed within a wellbore by wireline or as a part of a drill string. As noted above, the imaging tool includes the tool body 200 and one or more sensor pads 202. Each sensor pad has a sensor 204 and is coupled to the tool body 200 by an extendable coupling 206 that is operable to extend the sensor pad 206 away from, or retract the sensor pad 206 toward, the tool body 200. Each sensor 204 is coupled to the control unit, which causes the extendable coupling 206 to extend toward the wall 212 of the wellbore to gather an image of the formation surrounding the wellbore 220. In an embodiment, the sensor 204 is selected according to the measurement technique used to form the image of the wellbore formation. For example, the image may be a resistivity image, a gamma ray image, a sonar image, or any other image.

In the case of a resistivity image, the sensor may include one or more electrodes that apply a current to the formation and measure the response voltage that results from the applied current. The response voltage data may be processed to assemble a two-dimensional or three-dimensional image of the wellbore based on the measured voltage responses. In such an embodiment, the sensors 204 monitor resistivity of the wellbore wall 212 and the formation through which the wellbore passes. As referred to herein, resistivity is the ability of a substance to impede the flow of an electrical current. Tracking resistivity may help a drilling operator evaluate drilling operations by allowing the operator to differentiate between formations. Generally, portions of a formation that are filled with salty waters will exhibit good conduction of electricity while portions of a formation that are filled with hydrocarbons will be poor conductors of electricity. A resistivity image may therefore indicate whether or not a portion of a formation is saturated with water, an indication that may predict or help to evaluate producibility of the portion of the formation being imaged.

Two categories of resistivity logs, induction and laterolog may be used to gather an image of the wellbore. In an embodiment using laterolog, the sensors 204 may inject a current to the wall 212 of the wellbore and measure voltages at adjacent sensor pads 202, or adjacent sensors in the case of a sensor pad 202 having a plurality of sensors 204. In an embodiment using induction imaging (to, for example, compile an induction log), the sensors 204 comprise drive coils and receiver coils. The drive coils generate magnetic fields that develop currents in the formation and the receiver coils may detect and analyze the current induced in the formation by the drive coils. In such an embodiment, measured intensity of the current detected in the formation results in a resistivity measurement that may be used to form a resistivity image.

In some embodiments, the sensors 204 may provide resistivity measurements for depths of up to several tens of feet beyond the wall 212 of the wellbore. In such embodiments, the resistivity image may indicate that the drill bit (as discussed with regard to FIG. 1, is approaching the boundary of the portion of the formation that is rich in hydrocarbons so that a drilling operator may halt drilling operations before extending the wellbore beyond a target drilling zone. The resistivity images may also be used to identify dip, fractures and wellbore breakout.

While electrical resistivity imaging is discussed in detail, it is noted that in other embodiments, image data may also be conductivity image data, near-bit azimuthal gamma ray and inclination image data, oil-based mud imaging data, water-based mud imaging data, or other suitable types of imaging data. Where the image data is processed to generate a conductivity image, sensors 204 may have a similar configuration to that of a resistivity image, and may include a drive signal electrode that delivers a current to the wellbore wall and a receiving electrode that measures the conductivity of the wellbore wall.

In some embodiments, the image data may include gamma ray image data based on measurements of the natural gamma rays emitted by elements in the wellbore wall or formation. A gamma ray image may be helpful for quantifying shaliness, well-to-well correlation, depth correlation between open- and cased-hole logs, and for correlation between logging runs. Gamma ray image data may also be used to improve the steering of the drill string and to optimize well placement. Where the imaging tool 200 gathers gamma ray image data, the sensor 204 may include a gamma ray sensor, such as a spectrometer, and may further include a gamma ray source, or emitter. In an embodiment in which a gamma ray source is included, the sensor 204 may include gamma-gamma technology, such as a radioactive source with suitable detectors included within the sensor 204 to obtain, for example, a density measurement.

In an embodiment in which the imaging tool 200 gathers oil-based mud or water-based mud imaging data, each sensor pad 202 may include a plurality of sensors 204 and may be used to gather frequent resistivity measurements of the wellbore wall. For example, each sensor pad 202 may include six or more sensors 204 and may take approximately 120 samples per vertical foot of the wellbore.

In another embodiment, the imaging tool 200 may gather seismic imaging data, and the sensor pad 202 or sensor 204 may include a seismic signal generator, such as a seismic vibrator, and a geophone. The seismic signal generator applies a seismic signal to the formation and the geophone receives and records reflected signals that are indicative of the composition of the formation.

Figure 3:
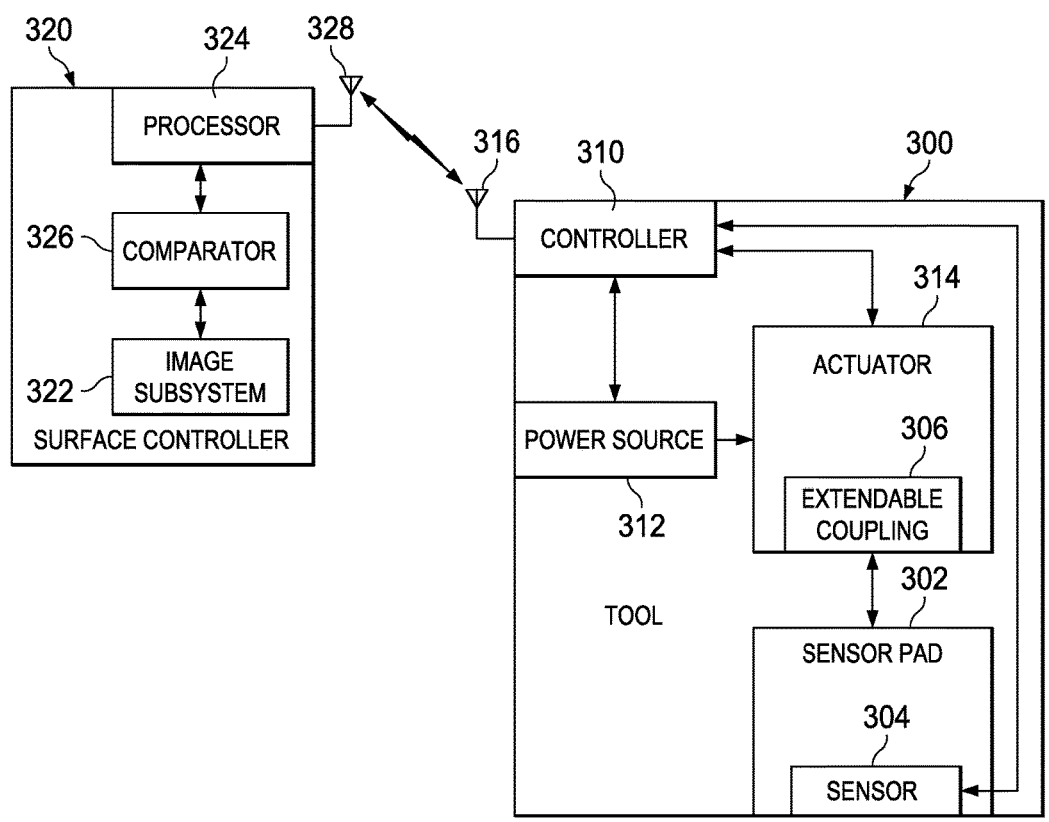
FIG. 3 is a block diagram showing an illustrative embodiment of a system that is operable to position sensors at optimal positions within a wellbore to obtain high resolution images of the wellbore wall and surrounding formation.

FIG. 3 shows an illustrative embodiment of a system, in schematic form, that positions sensors 304 in an optimal position to obtain high resolution images or other measurement data of the formation surrounding the wellbore. As shown in FIG. 3, the imaging tool 300 includes a controller 310, which is coupled to a transceiver 316, a power source 312, an actuator 314 of an extendable coupling 306, and one or more sensors 304. In turn, each extendable coupling 306 is coupled to a sensor pad 306 that includes one or more of the sensors 304.

The transceiver 316 of the imaging tool 300 is communicatively coupled to a transceiver 328 of a surface controller 320 by, for example, wire line, mud pulse telemetry, or another suitable form of wireless communication. The surface controller 320, in turn, includes a processor 324, a comparator 326, and an image subsystem 322. The surface controller 320 also may include a power source and a memory coupled to the processor 324, and the comparator 326 and image subsystem 322 may include a virtual comparator and virtual image subsystem formed by the processor and memory.

In an embodiment in which the sensors 304 are electrical resistivity sensors, it may be desirable to place each sensor 304 as close as possible to the wall of the wellbore to obtain a high resolution resistivity image. As such, images, or measurements taken by the sensors 304 may be communicated to the surface controller 320 via the transceivers 316, 328, where the images may be processed by the image subsystem 322. Here, distinct measurements or image data may be transmitted as sensor signals from the transceiver 316 of the imaging tool 300 to the transceiver of the surface controller 320. Each sensor signal may be a wire line transmitted signal, a mud pulse telemetry signal or other wireless signal that includes image data. The image data may be, for example, electrical resistivity image data, conductivity image data, near-bit azimuthal gamma ray and inclination image data, or water-based or oil-based mud imaging data.

According to an illustrative embodiment, the sensor pads 302 may be deployed within the body of the imaging tool 300, or extended by the extendable couplings 306 by a preselected or desired distance. The distance between the sensor 302 and the wall of the wellbore may have a significant effect on the resolution of an image provided by the sensor 302 because resolution and associated image quality will typically degrade as the sensor 302 moves away from the wall of the well bore. For example, in an illustrative embodiment, the quality of an image generated from the image data may degrade by more than 30% if the distance from the sensor 302 to the wall of the wellbore is more than a distance of 0.2 inches. To form a resistivity image of a sufficient resolution, the images formed by imaging data or measurements provided by the imaging tool 300 may be analyzed by the image subsystem 322 of the surface controller 320. As such, the surface controller 320 may determine the resolution of the image and compare the resolution of the image to an imaging threshold that corresponds to a desired or minimum acceptable image resolution. If the resolution of the image is below the threshold, the surface controller 320 may transmit a command, for example a downlink command, to the controller 310 of the imaging tool 300 to extend the extendable couplings 306 so that each of the sensors 304 will be placed in closer proximity to the wall of the wellbore. As the sensors 304 are placed closer to the wellbore wall, the image data gathered by the sensors 304 may increase in resolution, thereby enhancing the ability of the system to generate a high resolution image of the wellbore and surrounding formation.

In another embodiment, the image data transmitted to the surface controller 320 may include a measurement of the distance from the sensor 304 to the wellbore wall, or may be processed to determine the distance between the sensor 304 and the wellbore wall. In such an embodiment, the surface controller 320 may compare the measured or determined distance from the sensor 304 to the wellbore wall to a preselected or desired distance which may be, for example, 0.2 inches. If the measured or determined distance is greater than the preselected distance, then the surface controller 320 may generate a command, for example a downlink command, to the downhole control unit 310 to cause the extendable couplings 306 to extend the sensor 304 and sensor pad 302 toward the wall of the wellbore by a distance that is equal to the difference between the measured or determined distance and the preselected distance. In another embodiment, the surface controller may generate a command to the downhole control unit 310 to cause the extendable couplings 306 to extend the sensor 304 and sensor pad 302 toward the wall of the wellbore by a distance that is equal to the measured or determined distance from the sensor 304 to the wall of the wellbore.

It is noted that the system may operate while the wireline or drill string that includes the imaging tool 300 is in rotational motion or static. In an embodiment in which the wireline or drill string is static, it may be desirable to place the sensors 304 of the imaging tool 300 in direct contact with the wellbore wall. In such an embodiment, the surface controller 320 may transmit a command to the imaging tool 300 to cause the control unit 310 to extend the extendable couplings until the sensor pads 302 abut the wellbore wall. To ensure contact, each sensor pad 302 or extendable coupling may include a feedback mechanism to indicate when a force is experienced by the sensor pad 302 resulting from the sensor pad 302 being extended until a compressive force is exerted by the wall of the wellbore.

In another embodiment, the imaging tool 300 may be used to gather imaging data while the wireline or drill string is in rotational motion. In such an embodiment, the control unit 310 may map the location of the sensors 304 relative to a reference point so that data can be processed to form an image of the wellbore and surrounding formation relative to the reference point. It is noted that in such an embodiment, the resolution of the image may vary based on varying distances between the sensors 304 and the wellbore wall. It is further noted that the wellbore may not be perfectly circular or free from anomalies, such as raised or depressed areas, or peaks and valleys, relative to a median surface of the wall of the wellbore which may be computed based on, for example, the average radial distance from the center of the drill string or tool string to the wall of the wellbore. In such an embodiment, a similar feedback mechanism, such as a mechanical force-feedback mechanism, a laser locator, capacitive sensor, or sonar mechanism, may be included in the sensor pads or extendable couplings (or elsewhere in the tool body) to indicate points at which the sensor pads 302 contact the wall of the wellbore.

Profile data gathered from the feedback mechanism may be used by the controller 310 or surface controller 320 to generate a recorded profile of the wall of the wellbore at a particular depth or a predicted profile of the wall of the wellbore at a particular depth. In such an embodiment, the surface controller 320 may transmit a command to the control unit 310 as the imaging tool rotates to dynamically adjust the position of the sensors 304 relative to the wall of the wellbore based on the recorded or predicted profile of the wellbore wall. Such dynamic adjustment may involve changing the position of the sensors 304 to track, or to track an offset of, the recorded or predicted profile of the wellbore wall. The technique used for determining the profile of the wellbore wall may include using an acoustic transceiver mounted below the main sensors 304 to map the shape of the wellbore ahead of the sensor 304, thereby allowing for changes in the wellbore shape to be anticipated by the control system. Similar acoustic sensors may be mounted above the main sensors 304 to allow for logging in the upward direction.

Figure 4:
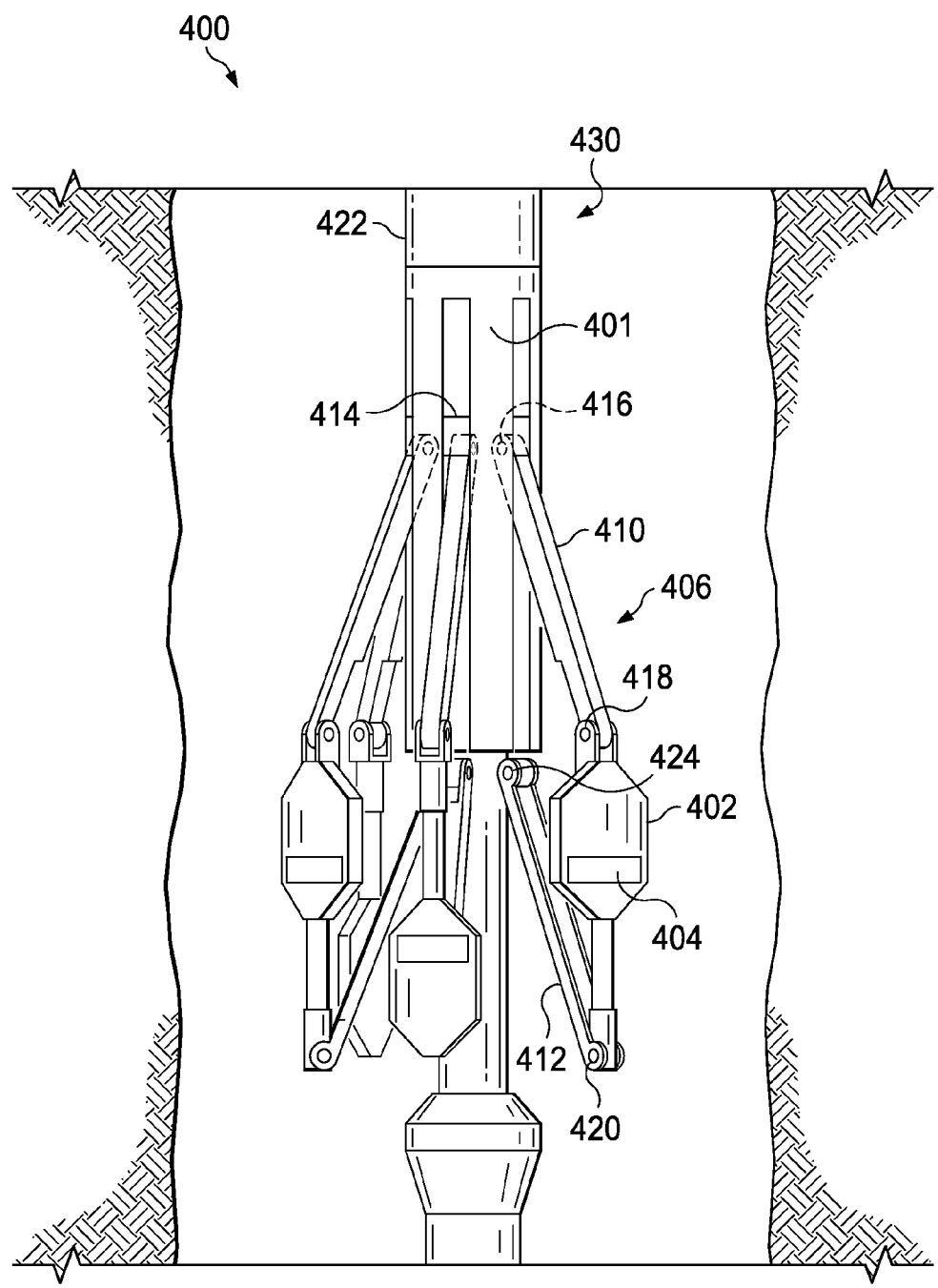
FIG. 4 is a front view of an imaging tool having extendable couplings and sensor pads according to an illustrative embodiment of the imaging tool.

Referring now to FIG. 4, an illustrative embodiment of a system 400 that includes an imaging tool 401 that is inserted within a drill string 430 to gather imaging data. Similar to the configuration described above with regard to FIGS. 2A and 2B, the imaging tool 401 includes a plurality of sensor pads 402, each of which may include a plurality of sensors 404. Each of the sensor pads 404 is radially extendable from the axis of the drill string 430 by an extendable coupling 406. The imaging tool 401 includes an electronics housing having a downhole control unit and a power source. The control unit is communicatively coupled to the extendable couplings 406 and is therefore operable to control the distance from which the sensor pads 404 are extended from the imaging tool 401.

The extendable couplings 406 of the imaging tool 401 are a three or more bar linkage that extends or retracts based on the axial movement of a piston 414. The piston 414 is coupled to a first linkage member 410 at a first hinge 416. The first linkage member 410 extends from the first hinge 416 and is coupled to the sensor pad 402, which is itself a second linkage member, at a second hinge 418. At the opposing end of the sensor pad 402, the sensor pad 402 is coupled to a third linkage member 412 at a third hinge 420. The other end of the third linkage member 412 is coupled to the imaging tool 401 at a fourth hinge 424. In operation, as the piston 414 moves axially along the longitudinal axis of the imaging tool 401, the first hinge 416 is also moved along the axis of the imaging tool 401. At a first location, the first hinge 416 may be positioned such that the extendable coupling 406, or linkage, is in a fully retracted position and the sensor pads 402 are positioned close to the body of the imaging tool 401. In response to the control unit receiving an automated or user-generated command from, for example, a surface controller, the control unit may cause the piston 414 to move upward along an axis of the drill string by providing a drive signal to a hydraulic or other motorized actuation mechanism. As the piston 414 moves upward, the first hinge 416 also moves upward, thereby applying tension to the first linkage member 410 and causing the second hinge 418, sensor pad 402, and third hinge 420, to also move upward. The third linkage member 412, however, is anchored at one end, such end being coupled to the fourth hinge 424, and therefore pivots away from the body of the imaging tool 401 as the piston moves upward. The pivoting of the third linkage member 412 causes the extendable coupling to extend, thereby placing the sensor 404 in closer proximity to the wall of the wellbore. It is noted that the sensor 404 and sensor pad 402 may be retracted by moving the piston 414 downward along the drill string.

Even though only a few specific examples are provided for the systems that may be employed to gather imaging data and position the sensors of an imaging tool within a wellbore, it is noted that the systems and configurations may be combined or applied in series in order to gather and optimize image data to provide a high resolution image of a wellbore and surrounding formation.

According to an illustrative embodiment, a tool for measuring a geological formation surrounding a wellbore includes a tool body and one or more sensor pads coupled to the tool body by extendable couplings. Each coupling is operable to adjust the radial position of the sensor pad by extending away from or retracting toward the center of the tool body. The tool further includes one or more sensors, with each sensor being mounted to one of the sensor pads and operable to obtain a measurement of a property of the formation. In addition, the tool includes a downhole control unit that has a transmitter and receiver, or a transceiver. The downhole control unit is operable to receive the measurement from the sensor and to transmit the measurement to a surface controller. In the illustrative embodiment, the transmitted measurement indicates a measurement resolution.

In an illustrative embodiment, a method for forming an image of a geological formation surrounding a wellbore includes deploying an imaging tool into the wellbore. The imaging tool has a tool body and one or more sensor pads, with each sensor pad having a sensor and being coupled to the tool body by an extendable coupling. Each extendable coupling is operable to extend the sensor pad away from or retract the sensor pad toward the tool body. The method further includes transmitting a sensor signal to a surface controller, receiving the sensor signal at the surface controller, determining the resolution of the sensor signal, and transmitting a command to the imaging tool to extend or retract the sensor pad based on whether the resolution of the sensor signal is above or below a predetermined value.

According to another illustrative embodiment, a system for generating an image of a geological formation surrounding a wellbore includes a surface controller, a drill string, and an imaging tool. The imaging tool has a tool body and plurality of sensors embedded within extendable pads coupled to the tool body by extendable couplings. The imaging tool also includes a downhole control unit communicatively coupled to the sensors, extendable couplings, and the surface controller. The downhole control unit is operable to receive a sensor signal from at least one of the plurality of sensors, which indicates a distance between the sensor and a wall of the wellbore, and the downhole control unit is operable to transmit a command to the extendable couplings to dynamically extend or retract the sensor pads.

It should be apparent from the foregoing that an invention having significant advantages has been provided. While the invention is shown in only a few of its forms, it is not limited to only these embodiments but is susceptible to various changes and modifications without departing from the spirit thereof.

We claim:

1. A tool for measuring a geological formation surrounding a wellbore, the tool comprising:
   a tool body;
   one or more sensor pads, each sensor pad being coupled to the tool body by an extendable coupling, each coupling being operable to adjust the radial position of the sensor pad by extending both away from and retracting toward the tool body;
   one or more sensors, each sensor being mounted to one of the sensor pads and operable to obtain a measurement of a property of the formation; and
   a downhole control unit comprising a transmitter and a receiver, the downhole control unit being operable to receive the measurement and transmit the measurement to a surface controller, wherein the transmitted measurement indicates a measurement resolution, wherein the downhole control unit is further operable to receive a control signal from the surface controller based on the measurement resolution, and to extend or retract the sensor pad in response to the control signal.

2. The tool of claim 1, wherein the extendable coupling comprises a biasing spring.

3. The tool of claim 1, where in the extendable coupling comprises a hydraulic piston.

4. The tool of claim 1, wherein the extendable coupling comprises a motorized extension arm.

5. The tool of claim 4, wherein the one or more sensor pads comprise one or more wearable pads and wherein each sensor is embedded within one of the wearable pads and offset from the outer surface of the wearable pad.

6. The tool of claim 5, wherein each of the sensors comprises a sensor selected from the group consisting of: an electrode, a geophone, and a gamma radiation sensor.

7. A method for forming an image of a geological formation surrounding a wellbore comprising:
   deploying an imaging tool into the wellbore, the imaging tool comprising a tool body and one or more sensor pads, each sensor pad having a sensor and being coupled to the tool body by an extendable coupling, wherein each extendable coupling is operable to both extend the sensor pad away from and retract the sensor pad toward the tool body;
   transmitting a sensor signal to a surface controller;
   receiving the sensor signal at the surface controller;
   determining the resolution of the sensor signal; and
   transmitting a command to the imaging tool to extend or retract the sensor pad based on whether the resolution of the sensor signal is above or below a predetermined value.

8. The method of claim 7, which the sensor signal comprises a mud pulse telemetry signal.

9. The method of claim 7, wherein the sensor signal comprises a resistivity measurement.

10. The method of claim 7, wherein the sensor signal comprises a signal from a geophone.

11. The method of claim 7, wherein determining the resolution of the sensor signal comprises:
    receiving a plurality of sensor signals;
    compiling the plurality of sensor signals to form an image of the formation; and
    determining whether the resolution of the image is above or below a predetermined threshold.

12. The method of claim 7, wherein transmitting a command to the imaging tool to extend or retract the sensor panel comprises transmitting a command to a hydraulic piston that extends or retracts the sensor pad in response to receiving the command.

13. The method of claim 7, wherein transmitting a command to the imaging tool to extend or retract the sensor panel comprises transmitting a command to a motorized extension mechanism that extends or retracts the sensor pad in response to receiving the command.

14. A system for generating an image of a geological formation surrounding a wellbore, the system comprising:
    a surface controller;
    a drill string;
    an imaging tool comprising a tool body, a plurality of sensors embedded within sensor pads coupled to the tool body by extendable couplings, and a downhole control unit communicatively coupled to the sensors, extendable couplings, and the surface controller,
    wherein each coupling is operable to adjust the radial position of the sensor pad by both extending the sensor pad away from and retracting the sensor pad toward the tool body;
    wherein each sensor is operable to obtain a measurement of a property of the formation, the measurement indicating a measurement resolution;
    wherein the downhole control unit is operable to receive the measurement and transmit the measurement to the surface controller; and
    wherein the downhole control unit is further operable to receive a control signal from the surface controller based on the measurement resolution, and to extend or retract the sensor pad in response to the control signal.

15. The system of claim 14, wherein the downhole control unit transmits the command to the extendable couplings to dynamically extend or retract the sensor pads based on whether the resolution of the imaging sensor signal is above or below a predetermined threshold.

16. The system of claim 14, wherein the surface controller comprises a comparator, and wherein:
    the surface controller is configured to receive a plurality of imaging signals and compile the imaging signals to form an image, the image being indicative of a cross-section of the geological formation; and
    the surface controller is further configured to determine a resolution of the image, determine whether the image resolution is above or below a predetermined threshold, and generate a command to extend or retract the extendable couplings based on whether the image resolution is above or below the predetermined threshold.

17. The system of claim 14, wherein the imaging sensors comprise electrodes and wherein the image comprises a resistivity image.

18. The system of claim 14, wherein the imaging sensors comprise geophones, and wherein the image comprises a seismic image.

* * * * *